(No Model.) 2 Sheets—Sheet 2.

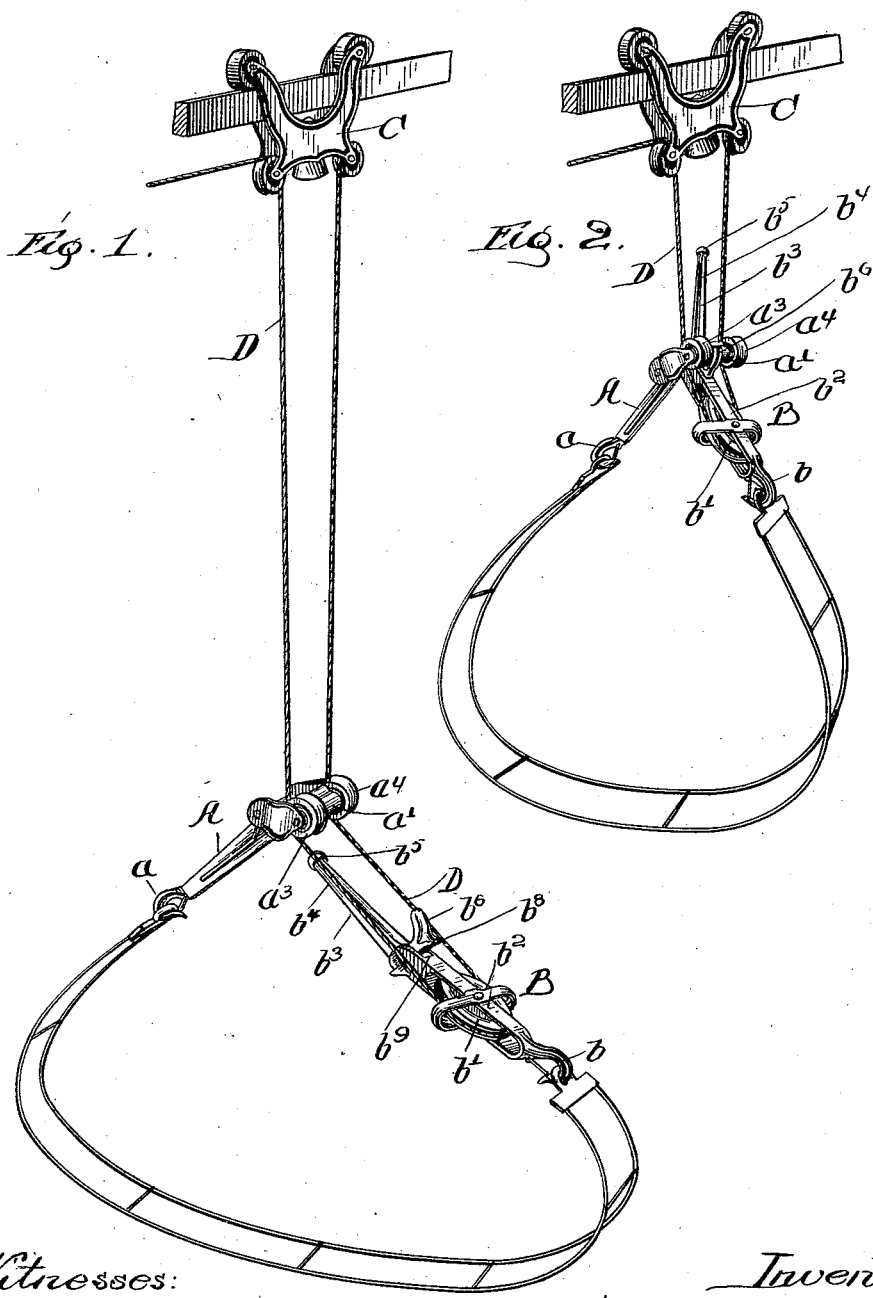

H. L. FERRIS.
HAY SLING.

No. 558,486. Patented Apr. 21, 1896.

Witnesses:
Chas. O. Hervey
A. J. H. Ebbesen

Inventor:
Henry L. Ferris
by Miles_____ Bitner
His Atty.

UNITED STATES PATENT OFFICE.

HENRY L. FERRIS, OF HARVARD, ILLINOIS.

HAY-SLING.

SPECIFICATION forming part of Letters Patent No. 558,486, dated April 21, 1896.

Application filed October 16, 1895. Serial No. 565,831. (No model.)

*To all whom it may concern:*

Be it known that I, HENRY L. FERRIS, a citizen of the United States of America, residing at Harvard, in the county of McHenry and State of Illinois, have invented certain new and useful Improvements in Hay-Slings, of which the following is a specification.

My invention relates to certain improvements in hay-slings, and pertains more particularly to the elevating-hooks and devices connected therewith by means of which said slings are brought together and elevated to the carrier.

Said invention consists in certain improvements in the means for uniting the opposite ends of the sling and connecting the same with the carrier when they reach the latter.

The drawings show the preferred form by means of six figures, of which—

Figure 3:
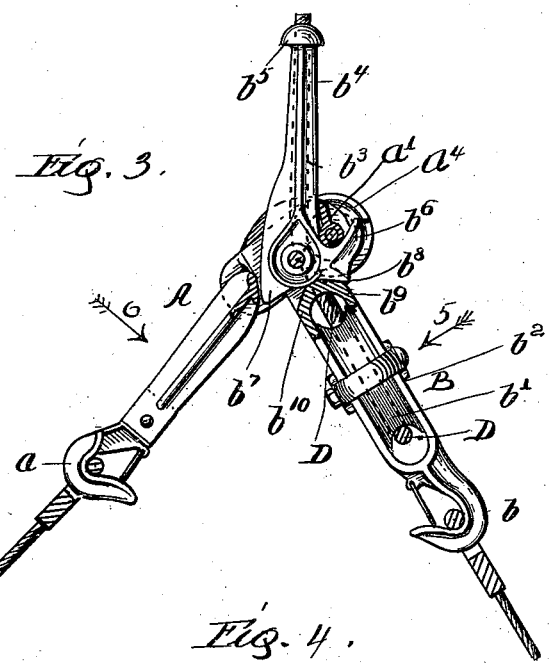
Figure 4:
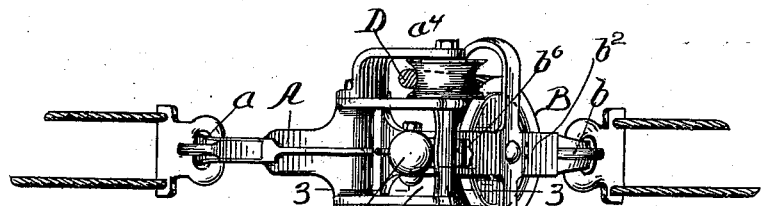
Figure 5:
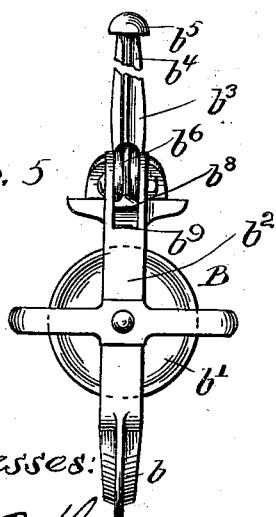
Figure 6:
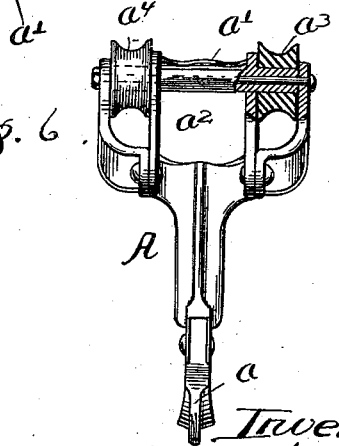

Figure 1 is a perspective of a carrier and sling together with the elevating hooks, pulleys, and ropes. Fig. 2 is a similar view in a different position. Fig. 3 is a section in line 3 3 of Fig. 4. Fig. 4 is a plan of the elevating hooks and pulleys. Fig. 5 is a side elevation of one of said hooks, and Fig. 6 is a side elevation of the other.

Hay-slings of the class to which my invention pertains are flexible devices—as, for instance, ropes or straps of sufficient length to extend from end to end of a load of hay and provided at the opposite ends with eyes for raising the slings. In loading the hay the slings are placed one at a time lengthwise of the wagon and a sufficient amount of hay loaded thereon, after which another sling is placed upon the top of the hay and another equal amount of hay put upon that.

In unloading the hay the ends of each sling in its turn are brought together by means of suitable devices and the hay then elevated to an ordinary carrier which takes it to the desired place.

The devices for elevating the sling here shown consist of two members A B, provided, respectively, at their lower ends with hooks $a$ $b$. A member A is provided with a yoke-shaped portion $a'$, through which is an opening $a^2$, upon opposite sides of which are two pulleys $a^3$ $a^4$, and the member B is provided with a single pulley $b'$ in a frame $b^2$, at the upper end in which is pivoted a head $b^3$. (See Fig. 3.) This head consists of an upwardly-extending pin $b^4$, terminating in an enlarged portion $b^5$ and having a laterally-extending hook $b^6$. The head also bears two shoulders $b^7$ $b^8$, and corresponding shoulders $b^9$ $b^{10}$ are provided upon the frame to act as stops to limit the motion of the head in both directions. The limited movement of the head is from the position shown in Fig. 3 to that seen in Fig. 1.

The carrier is lettered C and the elevating-rope D. The latter passes down from the carrier about one of the pulleys $a^3$ $a^4$, then around the pulley $b'$, then back beneath the other of the pulleys $a^3$ $a^4$, and then back to the carrier.

In engaging the hooks with the ends of the sling they are drawn apart, as seen in the position first shown in Fig. 1, in which the gravity of the head $b^3$ holds it in the position seen in said figure. In elevating the hay the pull of the rope A brings the hooked member B toward the member A, and as it approaches the same the head $b^3$ enters the opening $a^2$ in the yoke until the latter rests upon the hook $b^6$, when the weight thereof tilts said head upon its pivot into a vertical position, as seen in Fig. 3, and as the upward movement is continued this brings the head in the proper relation to the carrier to engage therewith.

I claim as new and desire to secure by Letters Patent—

1. A hay-carrier elevating pulley and yoke, comprising a pulley provided with an engaging and supporting head, and a yoke-supporting portion and a yoke through which the head is adapted to pass to engage a carrier, and which yoke when the head is engaged with the carrier, rests upon the yoke-supporting portion, substantially as described.

2. A hay-carrier elevating pulley and yoke, comprising a pulley provided with a detachable locking and supporting head, a yoke-supporting portion, and a yoke through which the head is adapted to pass to engage the carrier and which yoke when the head is engaged with the carrier is supported by the said portion from below, substantially as described.

3. The combination with the yoke, A, having the pulleys, $a^3$, $a^4$, and the opening, $a^2$, of the member, B, having the pulley, $b'$, and the head, $b^3$, pivoted to said member whereby it may assume different positions with respect thereto; substantially as described.

4. The combination with the yoke, A, having the opening, $a^2$ of the member, B, having the pivoted head, $b^3$, adapted to enter said opening and engage said yoke and to be thereby tilted into the proper position to lock with the carrier; substantially as described.

5. The combination with the yoke-shaped member, A, of the member, B, having the pivoted head, $b^3$, adapted to enter said yoke and bearing the hook, $b^6$, adapted to engage therewith; substantially as described.

6. The combination with the yoke-shaped member, A, of the member, B, having the shoulders, $b^9$, $b^{10}$, and the pivoted head, $b^3$, having the shoulders, $b^7$, $b^8$, adapted to engage therewith and limit the movement of the head upon the pivot; substantially as described.

7. The combination with the yoke-shaped member, A, of the member, B, having the shoulders, $b^9$, $b^{10}$, and the pivoted head, $b^3$, provided with the hook, $b^6$, and the shoulders, $b^7$, $b^8$, said head being adapted to enter the yoke and the hook thereon to engage with said yoke, and said shoulders being so located as to hold the head, $b^3$, substantially in line with the member, B, when under the influence of gravity alone and in a substantially vertical position when the yoke, A, rests in the hook, $b^6$; substantially as described.

HENRY L. FERRIS.

Witnesses:
LEWIS P. CARD,
JOHN S. KINSON.